United States Patent
Berger et al.

(10) Patent No.: US 6,323,726 B1
(45) Date of Patent: *Nov. 27, 2001

(54) OPERATING POINT ADJUSTMENT FOR A DIODE OF A DIODE NETWORK BY MEANS OF VOLTAGE INJECTION

(75) Inventors: Werner Berger, Ditzingen; Klaus Braun, Stuttgart, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,448

(22) Filed: Jul. 6, 1999

(30) Foreign Application Priority Data

Jul. 15, 1998 (DE) .............................. 198 31 715

(51) Int. Cl.[7] ....................................... H01J 19/16
(52) U.S. Cl. .......................................... 327/551; 359/194
(58) Field of Search ................... 359/157, 193, 359/194, 180; 327/306, 552, 551, 553, 493

(56) References Cited

U.S. PATENT DOCUMENTS

| | | | |
|---|---|---|---|
| 5,161,044 | 11/1992 | Nazarathy et al. . | |
| 5,210,633 | 5/1993 | Trisno | 359/194 |
| 5,327,279 | * 7/1994 | Farina et al. | 359/180 |
| 5,378,937 | 1/1995 | Heidemann et al. | 327/306 |
| 5,963,352 | * 10/1999 | Atlas et al. | 359/161 |

FOREIGN PATENT DOCUMENTS

| | | |
|---|---|---|
| 30 29 105 A1 | 2/1981 | (DE) . |
| 42 40 714 A1 | 7/1993 | (DE) . |
| WO97/35390 | * 9/1997 | (WO) . |

* cited by examiner

Primary Examiner—Jung Ho Kim
(74) Attorney, Agent, or Firm—Sughrue, Mion, Zinn, Macpeak & Seas, PLLC

(57) ABSTRACT

A diode network having at least one diode which during operation is located in the path of an HF signal, a predetermined diode voltage being applied to the diode to adjust its operating point, is characterised in that a control device is provided to maintain the diode voltage constant. With the invention it is advantageous that, due to the measurement of the DC voltage acting on the diode itself and influencing the operating point, it is not necessary to provide a low-resistance coupling between a voltage source and the diode, with respect to direct current.

8 Claims, 1 Drawing Sheet

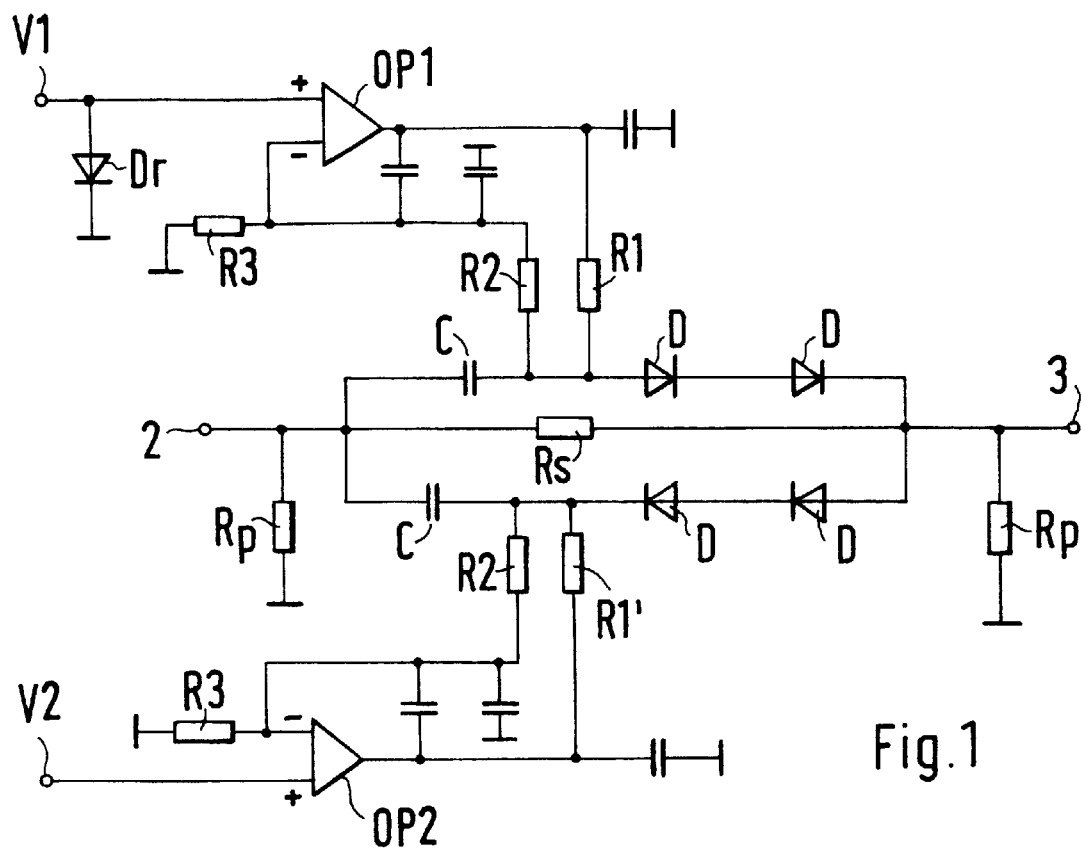
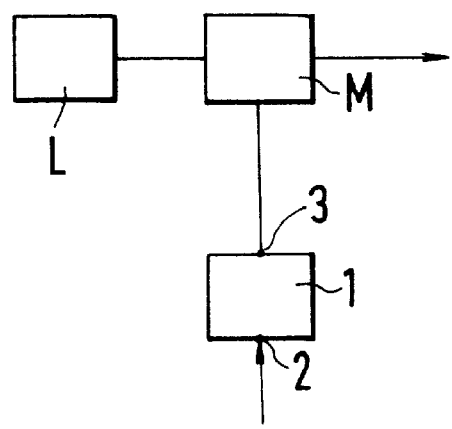
Fig.1
Fig.2

OPERATING POINT ADJUSTMENT FOR A DIODE OF A DIODE NETWORK BY MEANS OF VOLTAGE INJECTION

BACKGROUND OF THE INVENTION

The invention concerns a diode network having at least one diode, which in operation is located in the path of a high-frequency signal, a predetermined diode voltage being applied to the diode to adjust its operating point.

To adjust the operating point of a diode in a signal-influencing network, current injection on the one hand and voltage injection on the other hand is known. An arrangement with current injection is shown in FIG. 2 of U.S. Pat. No. 5,210,633. In such an arrangement, the DC voltage applied to the diode varies in accordance with fluctuations in the level of the signal passed by the diode, which can be a high-frequency signal. In this known arrangement, if the diode network involves a predistorter circuit for linearising the output signal of an optical modulator, then the operating point can only be optimised for a single value of the amplitude of the high-frequency signal. Therefore, in the known arrangement, for optimum linearisation of the characteristic it is necessary to correct the current sources according to the amplitudes of the input signal.

Furthermore, U.S. Pat. No. 5,161,044, FIG. 15, discloses a diode network of the type initially described for linearising the output signal of an external optical modulator, by which the light leaving a light source is modulated. Here the terminals of two diodes in an inverse-parallel connection in the signal path of the signal to be influenced, are connected to voltage sources via inductors having a low ohmic resistance. The inductors are used to decouple the signal path from the voltage sources. A disadvantage of such an arrangement is that the inductors have stray capacitances, so that complete decoupling of the signal path from the voltage sources is not possible.

SUMMARY OF THE INVENTION

The object of the invention is to create a voltage injection for an arrangement of the type initially described, in which the use of inductors is unnecessary for the decoupling of the voltage source from the diode.

This object is achieved in that a control device is provided to maintain the diode voltage constant.

With the invention it is advantageous that, due to the measurement of the DC voltage acting on the diode itself and influencing the operating point, it is not necessary to provide a low-resistance coupling between a voltage source and the diode, with respect to direct current. Rather, the source of electrical energy being used for adjusting the operating point of the diode can be coupled to the diode via a low-inductance resistor, dimensioned so that it provides adequate decoupling for high frequency. The control device ensures that, despite this resistor, constant voltage ultimately appears at the diode, even with fluctuations of the signal conducted through the diode.

An exemplary embodiment of the invention provides for the control device to be realised by means of operational amplifiers.

BRIEF DESCRIPTION OF THE DRAWINGS

The advantage is that an operationally reliable circuit can be realised easily by this means.

The invention also includes an arrangement which has an external optical modulator and a diode network according to the invention as predistorter circuit.

Further features and advantages of the invention are revealed in the following description of exemplary embodiments of the invention with the aid of the drawing, which shows details essential for the invention, and in the claims. Each of the individual features can be realised singly or jointly in any combination in an exemplary embodiment of the invention. In the drawing:

FIG. 1 shows an exemplary embodiment of a diode network with voltage injection for setting the operating points of the diodes, a parallel circuit having several diodes being connected in the signal path, FIG. 2 shows as a block diagram the arrangement with an optical modulator and a diode network according to the invention as predistorter circuit.

DETAILED DESCRIPTION OF THE INVENTION

In FIG. 1, the signal path of a signal-influencing circuit with a diode network involving, in the example, a predistorter circuit 1, (see also FIG. 2) is located between a terminal 2 (input) and a terminal 3 (output). The significance of these terminals 2 and 3 could be interchanged. The terminal 2 on the one hand and the terminal 3 on the other are each connected to earth via an ohmic resistor Rp and from a DC point of view, terminals 2 and 3 are interconnected via a resistor Rs. High-frequency components of the signal flow from terminal 2 to terminal 3 via two parallel branches, each formed by the series circuit comprising a capacitor C and two diodes D (semiconductor diodes), the diodes in the two branches being of opposite polarity and the capacitors C being directly interconnected. An operational amplifier OP1 has an output that is connected via a resistor R1 to the interconnection point between the capacitor C and the diode D of the upper branch connected to this capacitor. The interconnection point is, furthermore, connected via a resistor R2 to the inverting input of the operational amplifier OP1, and the inverting input is also connected to earth via a resistor R3. The non-inverting input of the operational amplifier OP1 is connected to one pole of a DC voltage source V1, whose other pole is earthed. Some of the leads running to the operational amplifier OP1 are also connected to earth and to each other via capacitors in the manner shown, in order to isolate high frequency from the signal path between the terminals 2 and 3 of the operational amplifier OP1.

In the example, the voltage V1 is positive and is designed so that it is equal to that voltage that is required by each individual diode D of the upper branch to set the desired operating point. The choice of operating point determines the effective steepness of the diode characteristic. Resistors R2 and R3 are designed so that a voltage of 2×V1 is fed to the interconnection point 3, seeing that two diodes D are connected in series. Generally, resistors R2 and R3 are chosen so that a voltage k×V1 is fed to the interconnection point 3, wherein in the example k is the number of diodes D connected in series. Therefore k=1+R2/R3.

The resistor R1 is used for decoupling the operational amplifier OP1 from the high-frequency signal. The gain of the operational amplifier OP1 is set by the ratio of resistors R2 and R3. Said resistors have extremely low inductance and capacitance; they are preferably so-called SMD (surface mounted device) resistors. The circuit can therefore easily be operated up to a frequency of approximately 860 MHz, for example.

In the example, all diodes D are of the same type. If required, it is possible to use different diodes in the series circuits. A series circuit of diodes is used if the desired characteristic of the signal effect (distortion or predistortion) cannot be obtained with a single diode. If there is only a single diode in a series circuit with a capacitor C, and the voltage V1 is the voltage required for this diode, then the associated operational amplifier must produce a gain of 1. For this it is advisable to remove the earthed resistor R3 without replacing it.

A similar circuit arrangement to that which was described in conjunction with the operational amplifier OP1 is also provided for the lower branch, where the operational amplifier assigned to this branch has the reference OP2 and the voltage V2 fed to its non-inverting input is supplied by a second voltage source and has a negative value with respect to earth, since the interconnection point between the capacitor C and the diode D connected to said capacitor of the lower branch is at the cathode of said diode, whereas in the upper branch the interconnection point is at the anode of the relevant diode D.

In FIG. 2, a light source L emits unmodulated light that is passed via a light guide to an input of an external optical modulator M, and leaves the modulator M as modulated light. The modulation signal is fed via the diode network of the circuit 1 to a modulation input of the modulator.

In the example, the external modulator M has a known phase modulator arrangement with an optical element based on lithium niobate (LiNbO$_3$). The output signal of such a modulator is substantially a cosine square function of the input signal; if therefore the input signal rises linearly, then the output signal of the modulator has a sinusoidal waveform. As predistorter, the circuit 1 according to the invention has the task of linearising the first half cycle symmetrically at the reversal point of the sine curve. This is achieved by first varying the modulation signal by means of the predistorter, so that when subsequently fed to the modulator the desired linearly-modulated light signal is produced with respect to the non-predistorted modulation signal (=high-frequency signal).

What is claimed is:

1. A diode network, comprising:
   at least one diode having a terminal; and
   a control device;
   wherein the diode is located in a series branch of a high-frequency signal that is between an input terminal and an output terminal, and that is not a shunt branch, wherein the diode is structured to receive a predetermined diode voltage to adjust an operating point of the diode, and wherein the control device is structured to maintain the predetermined diode voltage constant.

2. The diode network according to claim 1, wherein the control device has at least one operational amplifier.

3. The diode network according to claim 2, wherein the operational amplifier of the control device has a non-inverting input, an inverting input, and an output, wherein the operational amplifier is configured as a voltage amplifier, wherein a control voltage source is connected to the non-inverting input, and wherein the terminal of the diode is coupled to the output of the operational amplifier.

4. The diode network according to claim 3, further comprising a series resistor, via which the terminal of the diode is coupled to the output of the operational amplifier.

5. A modulator circuit, comprising:
   an optical modulator; and
   a diode network, comprising:
     at least one diode having a terminal; and
     a control device,
   wherein the diode is located in a series branch of a high-frequency signal that is between an input terminal and an output terminal, and that is not a shunt branch, wherein the diode is structured to receive a predetermined diode voltage to adjust an operating point of the diode, and wherein the control device is structured to maintain the predetermined diode voltage constant, wherein the diode network is connected, in a path of modulation signals, as a predistorter circuit to the modulator, and wherein the modulator is structured to receive the modulation signals.

6. The diode network according to claim 1, wherein the control device is decoupled from the diode by an ohmic resistor.

7. The modulator according to claim 5, wherein said control device has at least one operational amplifier.

8. An optoelectronic arrangement, comprising:
   a light source to generate an unmodulated light signal;
   a modulator to receive the unmodulated light signal from the light source and to output a modulated light signal; and
   a predistorter circuit to receive a high-frequency signal and to supply a modulation signal to the modulator,
   wherein the modulation signal modulates the unmodulated light signal in the modulator to generate the modulated light signal, wherein the predistorter circuit comprises a diode network having at least one diode and a control device having an operational amplifier, wherein the diode is located in a path of the high-frequency signal and configured to receive a diode voltage to adjust an operating point of the diode, and wherein the control device is configured to maintain the diode voltage constant.

* * * * *